US008789413B2

(12) United States Patent
Grzeslo et al.

(10) Patent No.: US 8,789,413 B2
(45) Date of Patent: Jul. 29, 2014

(54) UNIDIRECTIONAL CLUTCH ASSEMBLY

(75) Inventors: Richard Grzeslo, Mississauga (CA); Andrew Smich, Mississauga (CA)

(73) Assignee: Romet Limited, Mississauga (CA)

( * ) Notice: Subject to any disclaimer, the term of this patent is extended or adjusted under 35 U.S.C. 154(b) by 1525 days.

(21) Appl. No.: 11/859,339

(22) Filed: Sep. 21, 2007

(65) Prior Publication Data
US 2009/0078523 A1    Mar. 26, 2009

(51) Int. Cl.
*G01F 3/10*        (2006.01)
*F16D 41/066*    (2006.01)

(52) U.S. Cl.
CPC ............... *G01F 3/10* (2013.01); *F16D 41/066* (2013.01)
USPC ..... 73/261; 192/12 B; 192/223.2; 192/45.018

(58) Field of Classification Search
CPC ... G01F 3/10; F16D 41/066; F16D 2041/066; F16D 2041/0665
USPC ............. 73/115.04, 232, 233, 261; 192/12 B, 192/45.018, 223.2, 12 R, 45.019
See application file for complete search history.

(56) References Cited

U.S. PATENT DOCUMENTS

| | | | | |
|---|---|---|---|---|
| 1,222,712 A | * | 4/1917 | Armstrong | 192/12 B |
| 1,292,099 A | * | 1/1919 | Seymour | 192/12 B |
| 1,544,621 A | * | 7/1925 | Widmann | 192/12 R |
| 1,985,406 A | * | 12/1934 | Galkin | 192/12 B |
| 2,438,934 A | * | 4/1948 | Marsh | 73/233 |
| 2,438,935 A | * | 4/1948 | Marsh | 73/233 |
| 3,166,937 A | * | 1/1965 | Farrell | 73/233 |
| 3,221,850 A | * | 12/1965 | Bacon | 192/45 |
| 3,457,835 A | | 7/1969 | Siebold | |
| 3,969,939 A | | 7/1976 | Grzeslo | |
| 4,910,519 A | | 3/1990 | Duell et al. | |
| 5,305,647 A | * | 4/1994 | Atkinson | 73/861.01 |
| 5,970,791 A | | 10/1999 | Barczynski et al. | |
| 6,453,721 B1 | | 9/2002 | Grzeslo et al. | |
| 7,171,852 B2 | | 2/2007 | Smich et al. | |

OTHER PUBLICATIONS

Romet Limited, "Rotary Positive Displacement Gas Meters—Shop Manual", Aug. 1989.

* cited by examiner

*Primary Examiner* — Gene Crawford
*Assistant Examiner* — Terry Chau
(74) *Attorney, Agent, or Firm* — Bereskin & Parr LLP; Isis E. Caulder

(57) ABSTRACT

A unidirectional clutch assembly for coupling an input shaft to a driven shaft, uses an internal shaft positioned within a moveable clutch disc and a stationary clutch disc. The moveable disc has an engaging element for releasably engaging the internal shaft when the moveable clutch disc is rotated in a primary rotation direction by the driven shaft. The stationary clutch disc has a second engaging element for releasably engaging the internal shaft when the internal shaft is rotated relative to the stationary clutch disc in the opposite direction. When the driven shaft rotates in the primary rotational direction, the moveable clutch disc engages, and the stationary clutch disc disengages, the internal shaft, allowing it to rotate freely in the primary rotational direction. When the driven shaft rotates in the opposite direction, the moveable clutch disc disengages, and the stationary clutch disc engages, the internal shaft preventing its rotation.

24 Claims, 19 Drawing Sheets

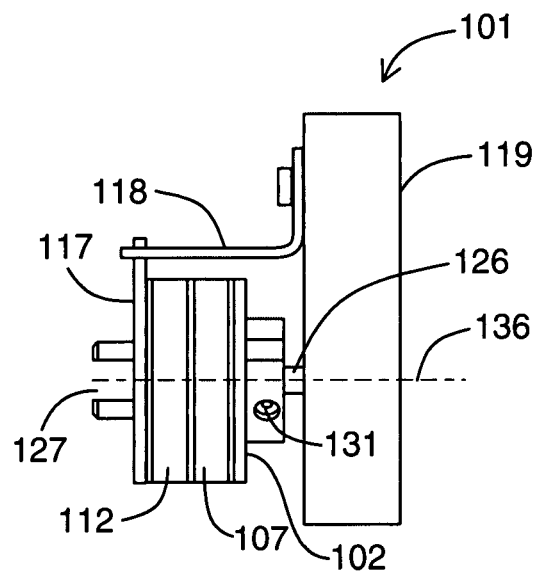
FIG. 5A FRONT VIEW
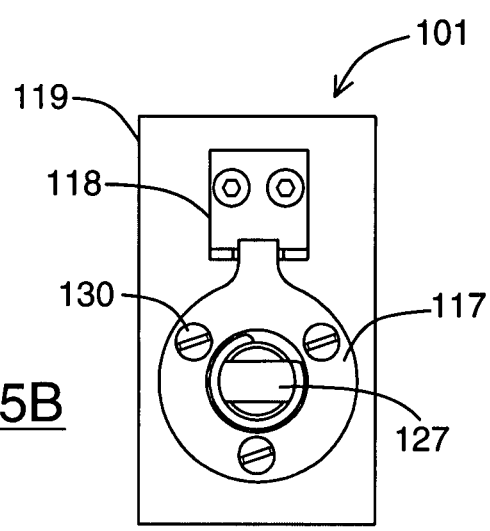
FIG. 5B END VIEW
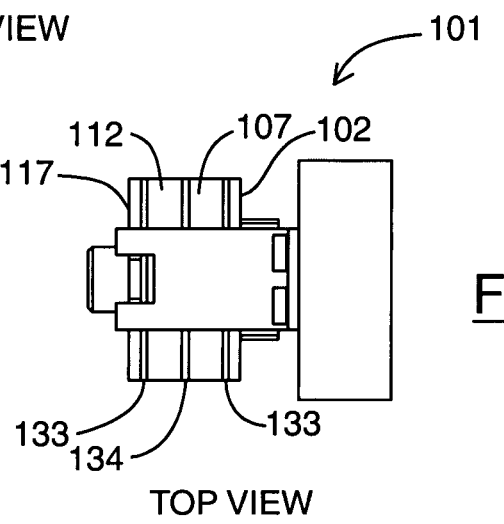
FIG. 5C TOP VIEW

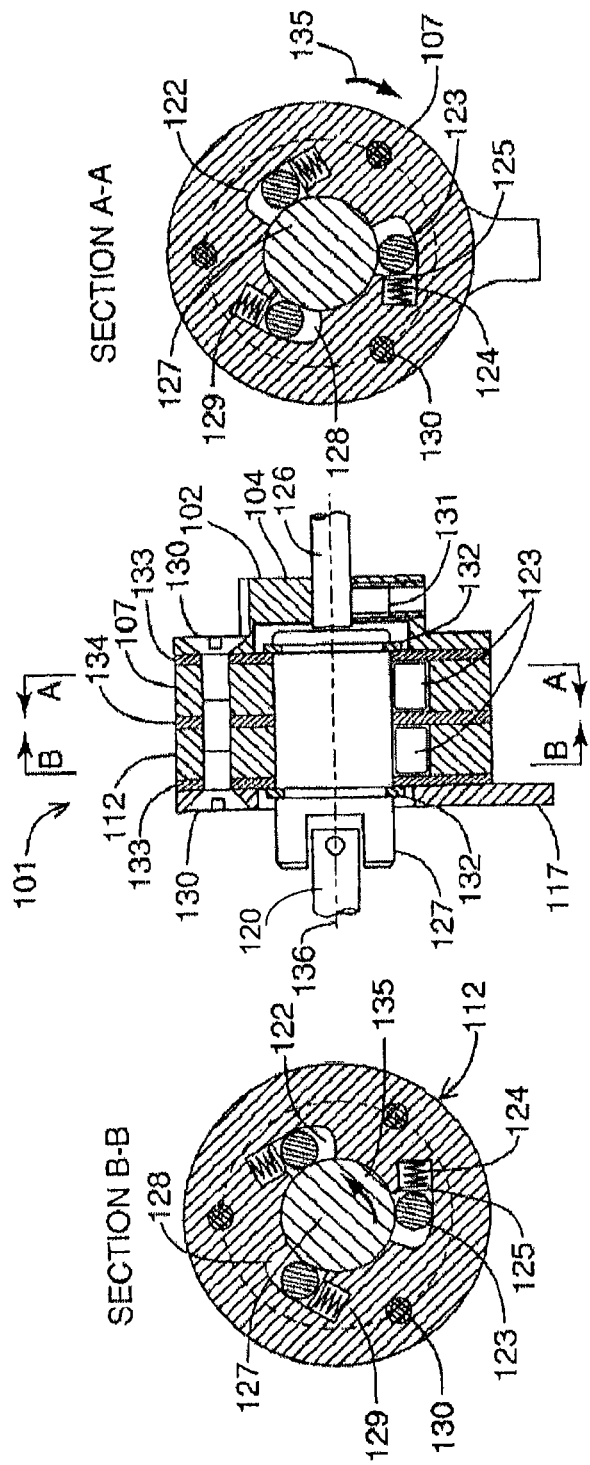

CUT-AWAY VIEW

END VIEW

UNIDIRECTIONAL CLUTCH ASSEMBLY

FIELD

The embodiments described herein relate to fluid flow measuring devices, and more particularly to a unidirectional clutch assembly used to improve the counting accuracy of a fluid flow meter.

BACKGROUND

Positive displacement rotary gas meters generally consist of a counter module and a gas meter pressure body. The gas meter pressure body converts gas flow into rotational motion via two solid impellers, which sweep out a known volume on each rotation. The impellers are precisely linked together using timing gears such that they rotate in a desired configuration. As a result of their fixed orientation and swept volumes, when the impellers are driven by a gas flow, the impellers only allow a set volume of gas to pass through the meter on each rotation. Accordingly, the quantity of gas passing through the meter can be calculated by counting the number of rotations of at least one of the impellers. Counting impeller rotations is commonly done by configuring the gas meter such that a mechanical or electronic counter module is driven by at least one of the impeller shafts via the use of a magnetic coupling module.

However, gas flow through a meter may become interrupted or temporarily reversed during normal operation of the gas meter, which can lead to temporary reversal of gas flow through the meter. Longer term reversal of gas flow can also result when a gas meter is improperly installed within a gas distribution system. Any such flow interruption or reversal can drive the impellers to rotate in a direction opposite their intended rotational direction. Opposite rotation of the impellers can result in the reverse rotation of the magnetic coupling within the magnetic housing and of the mechanical or electrical counter. The reversal of the mechanical or electrical counter will result in an inaccurate counting of the gas flow volume that has passed through the meter. There is therefore a need to design a rotary gas meter that will not be susceptible to these known types of counting.

SUMMARY

The embodiments described herein provide in one aspect, a unidirectional clutch assembly for coupling an input shaft to a driven shaft associated with a stationary body, said unidirectional clutch assembly comprising:

(a) an internal shaft adapted to be coupled to and aligned with the driven shaft at one end and the input shaft at the other end, said internal shaft having a longitudinal axis and an outer surface;

(b) a moveable clutch disc positioned orthogonal to the longitudinal axis of the internal shaft, and having a first opening shaped for receiving the internal shaft and a first engaging element for releasably engaging the internal shaft when the moveable clutch disc is rotated relative to the internal shaft in a primary rotation direction;

(c) a stationary clutch disc positioned orthogonal to the longitudinal axis of the internal shaft and parallel to the moveable clutch disc, said stationary clutch disc having its motion restrained by the stationary body such that it remains substantially stationary relative to the stationary body, said moveable clutch disc having a second opening shaped for receiving the internal shaft and a second engaging element for releasably engaging the internal shaft when the internal shaft is rotated relative to the stationary clutch disc in a direction opposite to the primary rotation direction;

(d) said internal shaft being positioned within the opening of each of the moveable clutch disc and the stationary clutch disc such that the surface of the internal shaft is in continuous rolling contact with the first and second engaging elements, such that:

(I) when the driven shaft rotates in the primary rotational direction, the first engaging element engages the moveable clutch disc with the internal shaft and transfers rotation to the internal shaft in the primary rotational direction and the second engaging element disengages the stationary clutch disc from the internal shaft to allow the internal shaft to rotate freely; and (II) when the driven shaft rotates in a direction opposite to the primary rotational direction, the first engaging element disengages the moveable clutch disc from the internal shaft and the second engaging element engages the stationary clutch disc with the internal shaft to prevent the internal shaft from rotating.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 5A is a front view of the unidirectional clutch assembly attached to a stationary body;

FIG. 5B is an end view of the unidirectional clutch assembly attached to a stationary body;

FIG. 5C is a top view of the unidirectional clutch assembly attached to a stationary body;

FIG. 7A is a cross-sectional view of the stationary clutch disc;

FIG. 7B is a cross-sectional view of the unidirectional clutch assembly;

FIG. 7C is a cross-sectional view of the moveable clutch disc;

Figure 1:
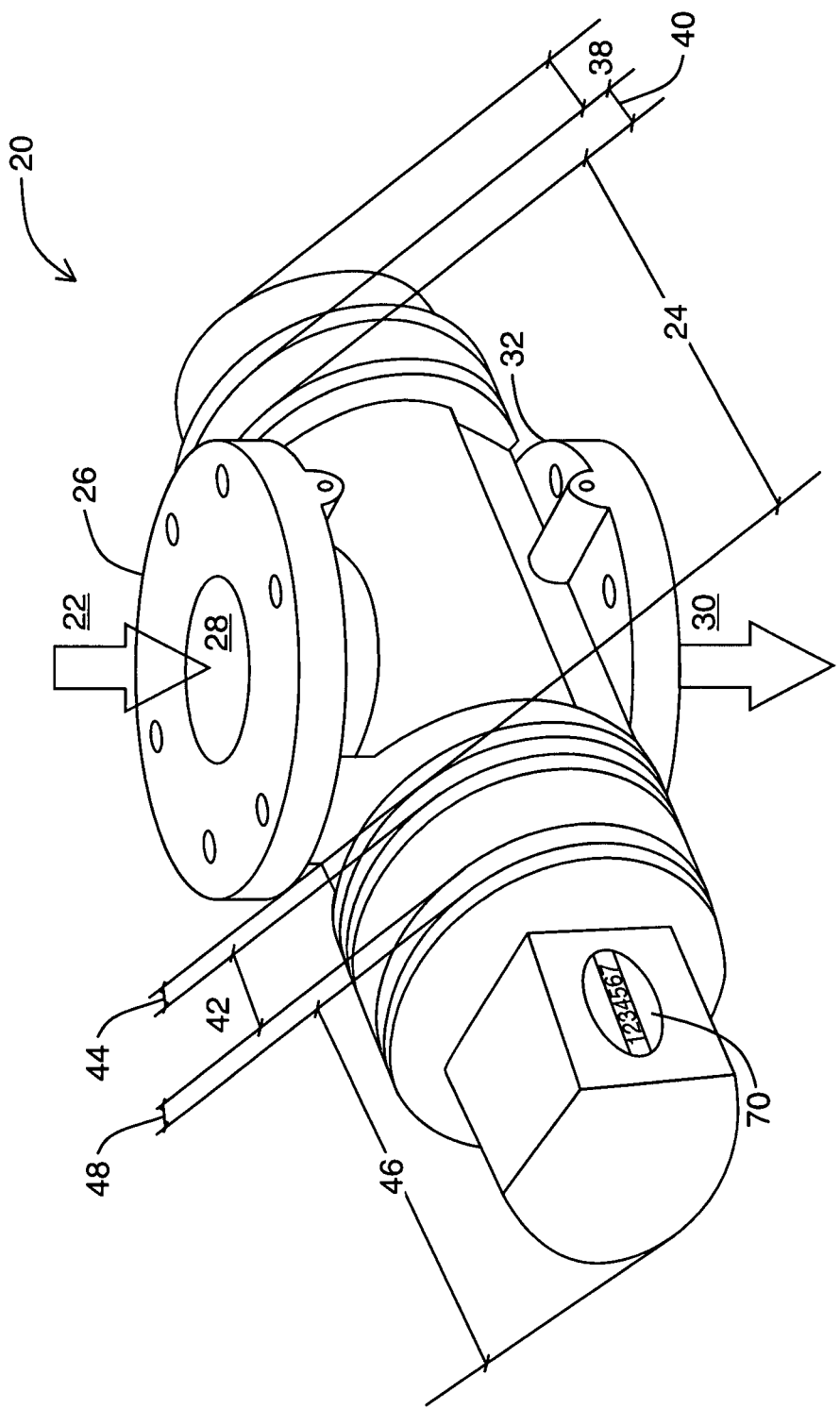
FIG. 1 is a perspective view of an exemplary positive displacement rotary gas meter within which the impeller assembly of the present invention may operate.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 2:
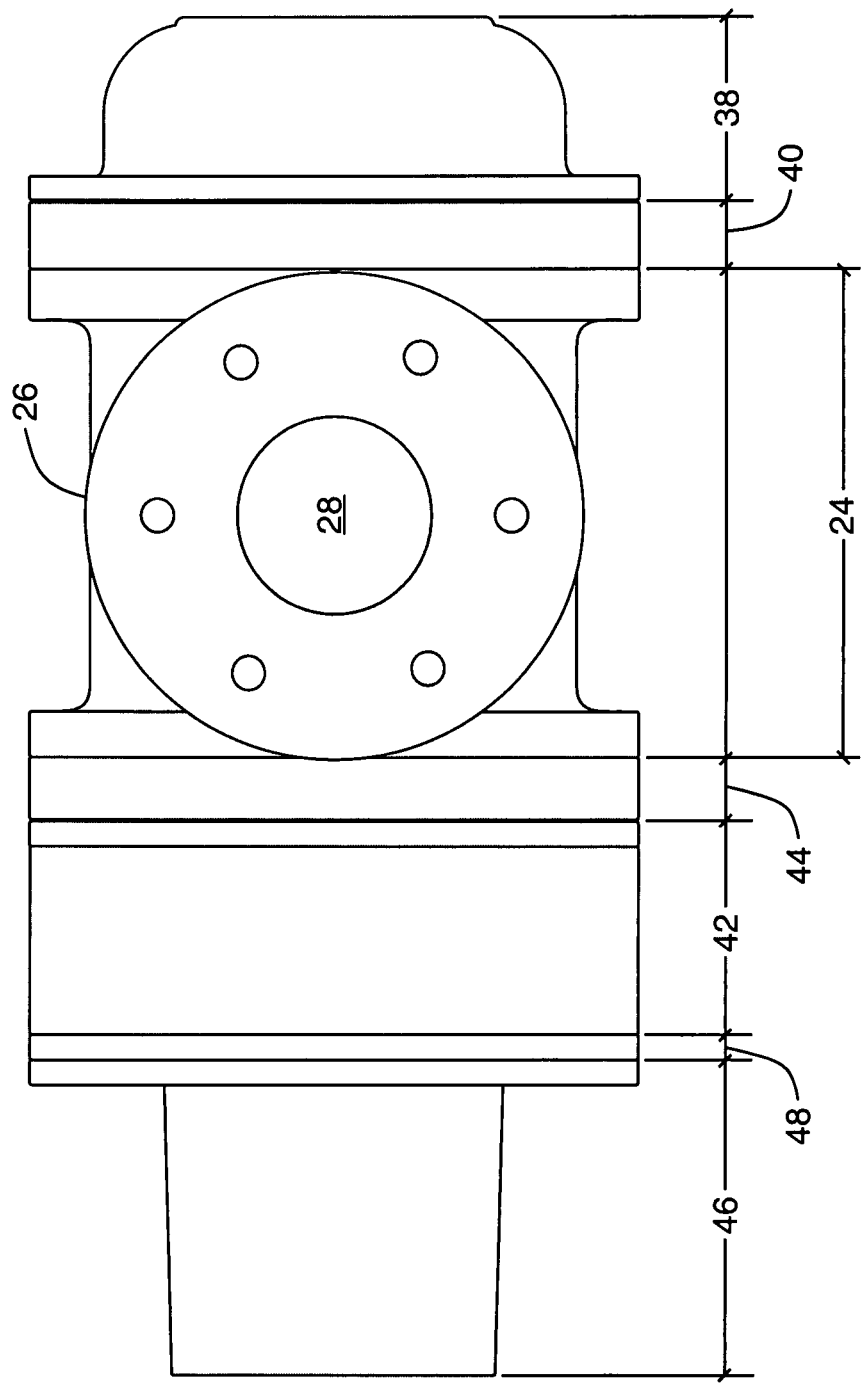
FIG. 2 is a top view of the exemplary positive displacement rotary gas meter of FIG. 1.

FIGS. 1 and 2 illustrate an exemplary positive displacement rotary gas meter 20 within which an impeller assembly operates. Natural gas flows from a pipeline (not shown) in the form of gas inflow 22 and enters the gas meter pressure body cylinder 24. The gas enters upper intake member 26 via upper aperture 28. The gas passes through gas meter pressure body cylinder 24 and exits gas meter 20 as gas outflow 30. Gas outflow 30 exits via a lower aperture (not shown) of lower output member 32, where it is then routed to the end consumer.

Referring to FIGS. 1 and 2, an exemplary rotary gas meter 20 includes a counter module 46, a magnetic housing 42, a thrust end section 38 and a gas meter pressure body cylinder 24. It should be understood that the exemplary rotary gas meter 20 also includes a thrust mounting headplate 40 and a counter headplate 44 which are mounted to the gas meter pressure body cylinder 24 such that they define a volume within the cylinder. The thrust end section 38 is coupled to the thrust mounting headplate 40 and the magnetic housing 42 is coupled to the counter headplate 44. The distal end of the magnetic housing 42 supports the counter module 46 via a counter mounting plate 48. It should be understood that he exemplary embodiment represents only one form of a positive displacement rotary gas meter 20.

Figure 3A:
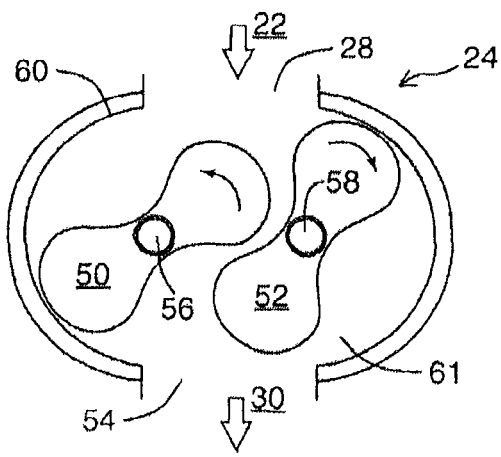
FIG. 3A illustrates a first position of the rotating impellers of the impeller assembly of the positive displacement rotary gas meter.
Figure 3B:
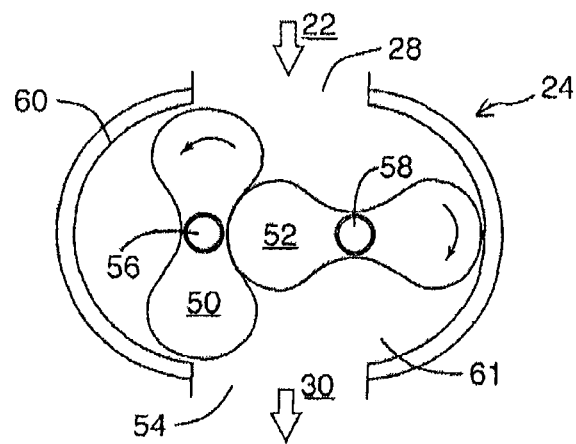
FIG. 3B illustrates a second position of the rotating impellers of the impeller assembly of the positive displacement rotary gas meter.

The exemplary rotary gas meter of FIGS. 1 and 2 includes at least one driven member within the gas meter pressure body cylinder 24. As shown in FIG. 3A, gas meter pressure body cylinder 24 contains two impeller members, a first impeller 50 and a second impeller 52. Impeller members 50 and 52 are preferably each a lobed figure-eight shape. In the embodiment of FIG. 3A and FIG. 3B, the impellers are solid figure eight-shaped figures. However, it should be understood that the impellers can take on different shapes and designs, so long as the shape allows for a quantifiable volume of gas to flow through the rotary gas meter. It should be understood that while the exemplary embodiment discloses a positive displacement rotary meter with two lobed impellers 50 and 52, other embodiments are contemplated. These other embodiments include positive displacement rotary meters with driven member(s) having different physical configurations. It is important to note that the impeller assembly can be used with any type of positive displacement rotary gas meter, recognizing that rotary gas meters can vary with respect to specific configuration.

Gas inflow 22 enters pressure body 24 via upper aperture 28 and creates a force on impellers 50 and 52. This force causes impeller 50 and 52 to rotate as successively shown in FIGS. 3A and 3B. As is conventionally known, impellers 50 and 52 rotate because a lower relative pressure is created at lower aperture 54 than exists at upper aperture 28. Thrust end section 38 (see FIGS. 1 and 2) encloses lubricating oil and timing gears that fix the position of the impellers orthogonal to each other and provide for their contra-rotation. As a result, impellers 50 and 52 rotate synchronously, in a fixed relative position.

As shown in FIGS. 3A and 3B, each impeller 50 and 52 rotates about an axis defined by its respective impeller shaft, located at its center of gravity. Specifically, impeller 50 is able to rotate about an axis defined by a first impeller shaft 56, while impeller 52 is able to rotate about an axis defined by a second impeller shaft 58. As impellers 50 and 52 rotate, a fixed volume of gas is trapped between the surface of each impeller 50 and 52 and the inner body wall surface 60. Inner body wall 60 defines an internal chamber 61, which is of a specific volume. The fixed volume of gas is then moved toward lower aperture 54. Therefore, with each full impeller rotation, a known volume of gas travels between upper aperture 28 and lower aperture 54. While the present description is being provided assuming the medium of a gas (most preferably natural gas), it should be understood that the positive displacement rotary meter 20 could be used to measure any type of gas or other fluid.

With each rotation of impellers 50 and 52, a quantifiable volume of gas passes through rotary meter 20, ultimately being transferred to the end consumer for use. Therefore, the faster the rotation of the impellers, the larger the volume of gas that is being used by the end consumer. Because impellers 50 and 52 remain in a fixed relative position, it is only necessary to measure the rotational movement of one of them. Although not necessary, the movement of both impellers 50 and 52 can also be measured. There are several means by which the rotation of impellers 50 and 52 can be converted into a quantified volume. Typically, one impeller is magnetically coupled to an electronic recording device or, alternatively, may be geared to a mechanical register. Additional means include, but are not limited to, the use of contact closures, optical sensors and proximity detectors.

The exemplary rotary gas meter of FIGS. 1 and 2 comprises a magnetic housing 42 that is in communication with impellers 50 and 52. Typically, a magnetic coupling device (not shown) is situated within magnetic housing 42. This device senses movement by sensing the passage of at least one magnet fixed to either one or both rotating impellers 50 and 52. Alternatively, a Wiegand sensor (not shown) may be mounted externally of the gas meter pressure body cylinder 24. The Wiegand sensor then transfers a signal to an electronic recording device (not shown). The electronic recording device compensates for density changes due to temperature fluctuations in the gas being metered, resulting in an accurate measurement of the consumed gas. As is conventionally known, all recording devices (i.e., mechanical or electric) are mounted on the magnetic housing and according to industry standard.

Figure 11:
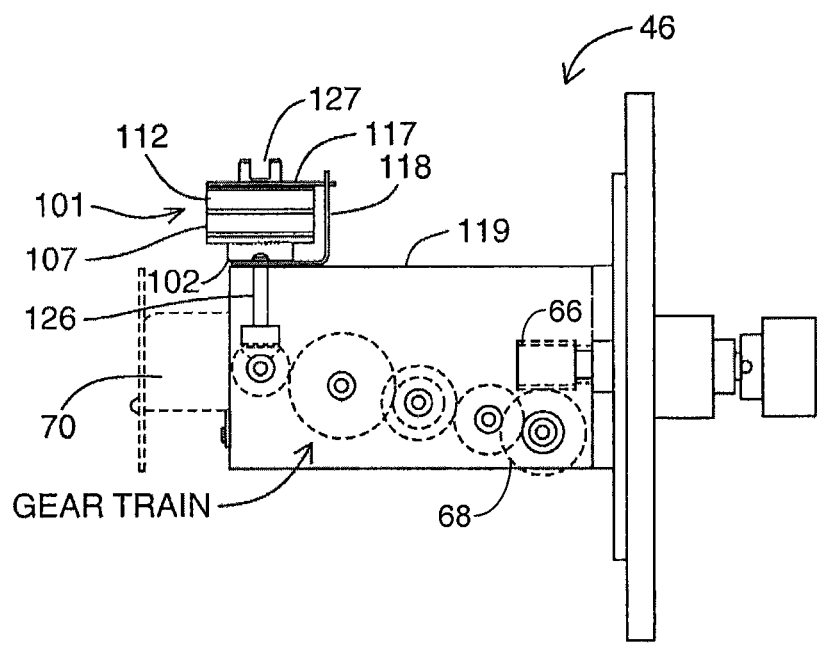
FIG. 11 is a side view of the unidirectional clutch assembly positioned within the counter module of a positive displacement rotary gas meter.
Figure 12B:
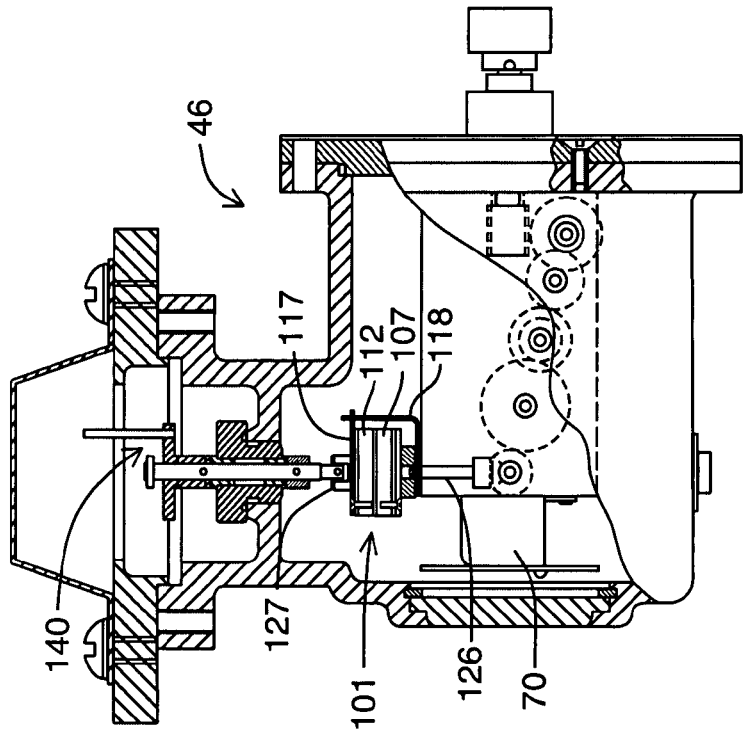
FIG. 12B is a cut away view of a positive displacement rotary gas meter counter module showing an optional installation placement of the unidirectional clutch assembly.
Figure 12A:
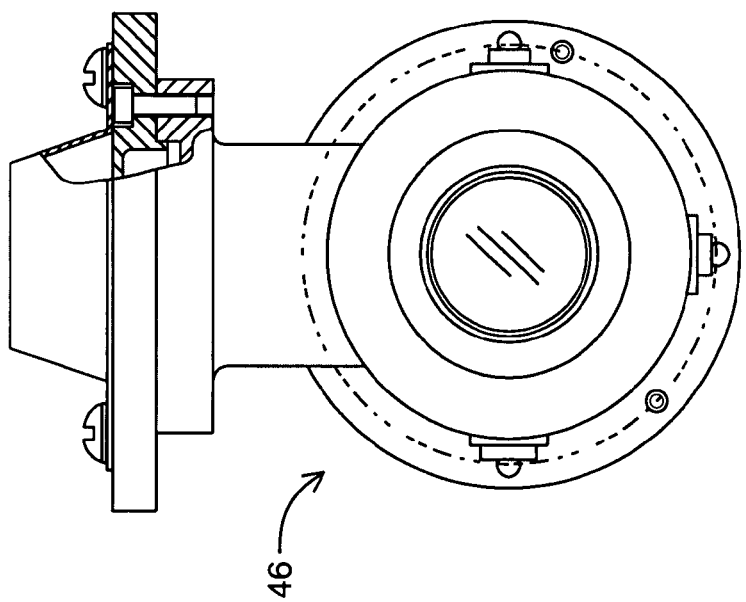
FIG. 12A is an end view of a positive displacement rotary gas meter counter module showing an optional installation placement of the unidirectional clutch assembly.

In an exemplary embodiment of a rotary gas meter 20 shown in FIGS. 1, 2, 3A and 3B, gas flowing through the meter 20 causes rotation of impeller 50, which actuates a mechanical counter 70 using a simple drive gear train to count a number directly proportional to the number of rotations of impeller 50. It should be understood that while it is preferable to use a drive gear 66 and worm gear 68 as the gear train (see e.g. FIG. 11), any combination of gears could be used to couple the impeller(s) 50, 52 and the mechanical counter 70. Further, it should be understood that it is also possible for the impellers 50, 52 to be directly connected to the mechanical counter 70.

The value appearing on the mechanical counter 70 can be manipulated in a variety of ways to determine the amount of gas consumed over a period of time. In the alternative, the mechanical counter 70 can be omitted, utilizing alternative recording means to record the number of rotations. Such recording means may include an electronic recorder, for example. Using an example where a mechanical counter 70 is used, the value on mechanical counter 70 is retrieved and an appropriate conversion factor is determined. This determination can be based on the type of gas meter 20 being tracked (e.g. by part or make number). Then, the value of mechanical counter 70 is multiplied by the conversion factor to calculate the volume of gas that has been displaced by the gas meter. Typically, the conversion exercise is carried out using an electronic apparatus.

The magnetic/electronic and mechanical/electronic means provided for converting impeller rotation to a quantifiable volume of gas have been provided merely as illuminative examples. It is important to note that the impeller assembly of the claimed invention is applicable to all types of rotary positive displacement gas meters, among which a vast array of methods are used to convert impeller rotation to useful gas volume measurements.

Figure 4:
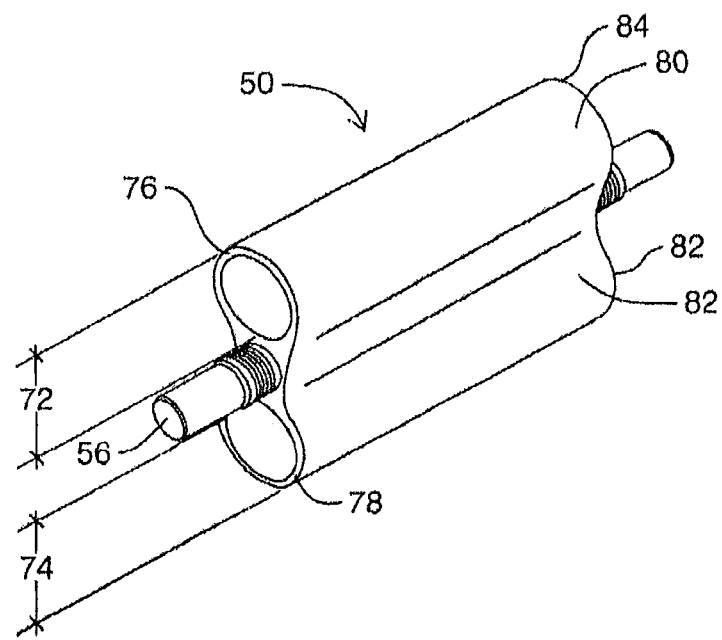
FIG. 4 is perspective view of an impeller which is known in the art.

FIG. 4 illustrates a perspective view of a typical embodiment for the impeller of either impeller 50 or 52, as known in the art. Assuming the illustrated impeller is first impeller 50, first impeller shaft 56 represents the axis of rotation for impeller 50. It should be noted that although first impeller 50 is being used as an example, all indicated parts of impeller 50 correspond to like parts of second impeller 52.

As is known in the art, impeller shaft 56 typically divides the impeller into two lobes 72 and 74. Each lobe is approximately circular in shape, so as to define a generally figure-eight shaped impeller 50. However, each impeller 50 and 52 can take on various designs, as long as the overall assembly functions to trap a quantifiable volume between each impeller member and the inner body wall surface 60.

In the illustrated embodiment of FIG. 4, each lobe 72 and 74 is hollowed out so as to define a generally circular lobe wall (76 and 78, respectively). The exterior surface of first lobe wall 76 is defined by a first primary surface 80. First primary surface 80 is in communication with a second primary surface 82 of second lobe wall 78. First primary surface 80 and second primary surface 82, along with the transition surface there between, serve to define the figure eight-shaped shell of impeller 50.

It is known to those skilled in the art that gas flow through a meter may become interrupted or temporarily reversed during normal operation of the gas meter or that a gas meter may be improperly installed leading to reverse gas flow. It is also known to those skilled in the art that such flow interruptions or flow reversals can drive the impellers 50 and 52 to rotate in a reverse direction. Reverse rotation of the impellers 50 and 52 in conventional gas meters, as illustrated in FIGS. 1 to 9, can result in the reverse rotation of the magnetic coupling (not shown) within the magnetic housing 42 and of the mechanical counter 70. Reversal of the mechanical counter 70 results in an inaccurate counting of the gas flow volume that has passed through the meter.

For the following discussion relating to FIGS. 5A to 19, the term "engaged" should be understood to describe the condition when a clutch disc 107, 112 becomes coupled to the internal shaft 127 such that there can be no relative movement between the clutch disc 107, 112 and the internal shaft 127.

FIGS. 5A-10C show an exemplary embodiment of a unidirectional clutch assembly 101. The unidirectional clutch assembly 101 is intended to address these aforementioned problems. As will be discussed, in one exemplary implementation, unidirectional clutch assembly 101 advantageously responds to a flow reversal by automatically decoupling the mechanical counter 70 or the positive drive clutch assembly 140 (as shown in FIGS. 12A to 13B and 19) from reverse rotation of the impellers 50 and 52 thereby reducing any counting error. In another exemplary implementation, a combination of two unidirectional clutch devices 101 allows the meter to accurately count both primary and reverse gas flows. In another exemplary implementation, the unidirectional clutch assembly 101 prevents reverse rotation of the mechanical counter 70 and impellers 50 and 52 by locking the impellers 50 and 52 in a fixed position.

FIGS. 5A, 5B and 5C together show an orthographic projection of a unidirectional clutch assembly 101. As the front, end and side views illustrate, the unidirectional clutch assembly 101 is prevented from rotating with respect to a stationary body 119 using a stationary support 118 restraining the clutch arm 117. The mounting disc 102 of the clutch assembly 101 has an opening formed in its center and is sized to concentrically receive a moveable shaft 126 that rotates about a longitudinal axis of rotation 136 as shown in FIG. 6.

In an exemplary embodiment of the clutch assembly 101, the moveable shaft 126 is comprised of, or is connected to and driven by, one or more of the impellers 50, 52 of a positive displacement rotary gas meter 20 (not shown). The mounting disc 102 is fixedly coupled to the moveable shaft 126 such that the mounting disc 102 rotates in unison with the moveable shaft 126. In an exemplary embodiment of the unidirectional clutch assembly 101 the mounting disc 102 is coupled to the moveable shaft 126 using a set-screw 131. However, it would be understood by persons skilled in the art that the mounting disc 102 could be coupled to the moveable shaft 126 using any mechanical or chemical connector known in the art that would result in the mounting disc 102 turning in unison with the moveable shaft 126. Examples of possible connectors include: key and keyway, screw, nut and bolt, rivet, glue or chemical adhesive, threads, spot welding or forming the mounting disc 102 as an integral component of the moveable shaft 126 or the moveable clutch disc 107.

In addition to being fixedly coupled to the moveable shaft 126, the mounting disc 102 is also fixedly coupled to the moveable clutch disc 107 such that the moveable clutch disc 107 turns in unison with the mounting disc 102 and the moveable shaft 126. In an exemplary embodiment, the mounting disc 102 is fixedly coupled to the moveable clutch disc 107 using screws 130. However, it would be understood by persons skilled in the art that the moveable clutch disc 107 could be coupled to the mounting disc 102 using any of the connectors that can be used to attach the mounting disc 102 to the moveable shaft 126 as discussed above.

Figure 6:
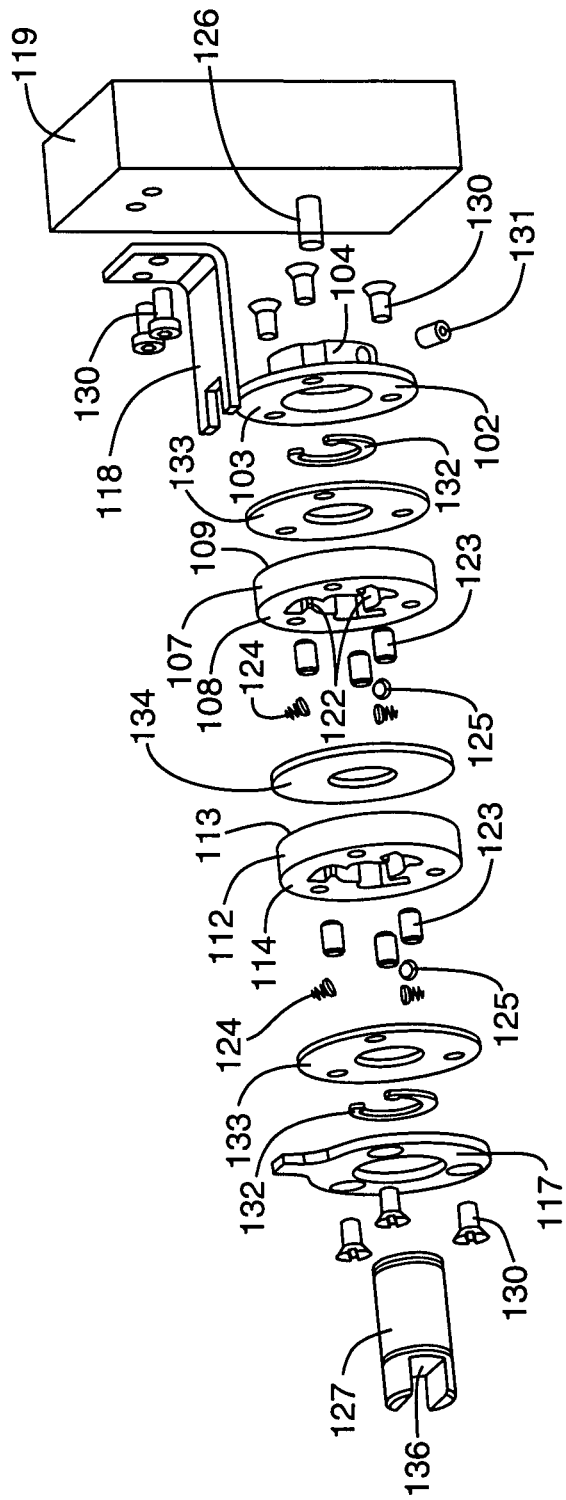
FIG. 6 is an exploded view of the unidirectional clutch assembly.

FIG. 6 shows an exploded view of an exemplary embodiment of the unidirectional clutch assembly 101. As described above, the mounting disc 102 is fixedly coupled to the moveable shaft 126 using a set-screw 131 and moveable clutch disc 107 is coupled to the mounting disc 102 using screws 130. A spacer 133 is positioned between the mounting disc inner face 103 and the moveable clutch disc outer face 109. A center spacer 134 is positioned between the moveable clutch disc inner face 108 and the stationary clutch disc inner face 113. Another spacer 133 is positioned between the stationary clutch disc outer face 114 and the clutch arm 117.

The internal shaft 127 is positioned within the center openings of the clutch arm 117, clutch discs 107 and 112, center spacer 134 and spacers 133 as illustrated. Retaining rings 132 are positioned adjacent to the two outer spacers 133 and are configured to attach securely to the internal shaft 127 thereby holding the spacers 133, center spacer 134 and clutch discs 107, 112 in their correct relative positions during the operation of the clutch. It would be understood by a person skilled in the art that any comparable securing device could replace retaining rings 132.

Figure 13A:
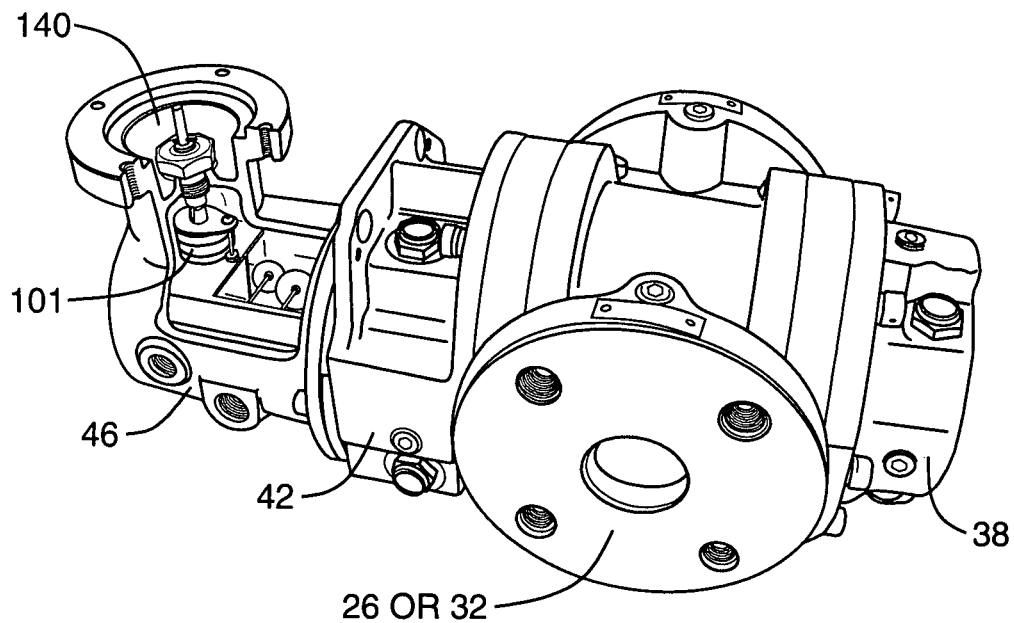
FIGS. 13A and 13B show a positive displacement rotary gas meter counter module showing an optional installation placement of the unidirectional clutch assembly.
Figure 13B:
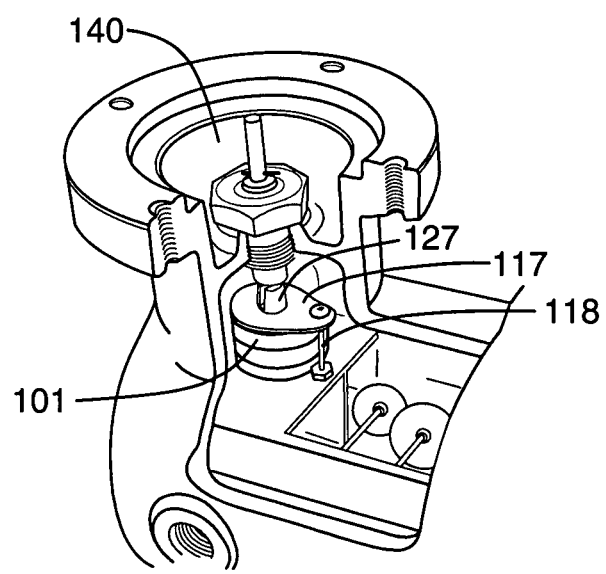

FIG. 6 illustrates how the clutch arm 117 is fixedly coupled to the stationary clutch disc 112. The stationary clutch disc 112 and the clutch arm 117 are then prevented from rotating relative to the stationary body 119 by the stationary support 118. In an alternative embodiment, as shown in FIGS. 13A and 13B, the clutch arm 117 may be fixedly coupled to the stationary body 119 by the stationary support 118. In an exemplary embodiment, the stationary body 119 comprises a portion of the casing of the gas meter 20 itself. Alternatively, the stationary body 119 can be the magnetic housing 42, the thrust end section 38, the counter module 46, or any other surface in proximity to the gas meter 20 that remains stationary relative to the moveable shaft 126. In an exemplary embodiment, the unidirectional clutch assembly 101 is supported in its operational position by its physical connection to the stationary support 118 and the moveable shaft 126.

As shown in FIGS. 5C and 6, the internal shaft 127 of the unidirectional clutch assembly 101 is positioned concentrically through the center opening formed within each of the clutch arm 117, center spacer 134, spacers 133 and the moveable and stationary clutch discs 107, 112. The internal shaft 127 is positioned so that it is aligned with, and rotates around, the longitudinal axis of rotation 136.

The internal shaft 127 rotates relative to either the moveable or stationary clutch disc 107, 112 as long as the moveable or stationary clutch disc 107, 112 is disengaged with the internal shaft 127, respectively (as explained in detail below). In one exemplary embodiment of the unidirectional clutch device 101, the stationary clutch disc 112 and the moveable clutch disc 107 are configured and positioned such that the moveable clutch disc 107 only becomes engaged with the internal shaft 127 when the impellers 50, 52 are rotated in the primary rotational direction whereas the stationary clutch disc 112 only becomes engaged with the internal shaft 127 when the impellers are rotated in a reverse direction.

In the exemplary embodiment shown in FIG. 6, spacers 133 are positioned between the mounting disc 102 and the moveable clutch disc 107 and also between the stationary clutch disc 112 and the clutch arm 117. A center spacer 134 is positioned between the moveable clutch disc 107 and the stationary clutch disc 112. In an exemplary embodiment, the center spacer 134 and spacers 133 are used to keep the internal contents of the clutch discs 107, 112 in place, to allow proper movement of the clutch discs 107, 112 and to provide some protection to the clutch assembly 101. It would be understood by persons skilled in the art that clutch assembly 101 could be operated using only the center spacer 134 if an alternate containment and protection apparatus was used in place of the spacers 133, for example a housing container (not shown). In an exemplary embodiment, the unidirectional clutch assembly 101 contains two discs 107, 112 but it should be understood that the unidirectional clutch assembly 101 could alternatively operate with more discs.

FIG. 7B illustrates a cross-sectional view of an exemplary embodiment of the unidirectional clutch 101. As shown, mounting disc 102 is fixedly coupled to moveable shaft 126 via set-screw 131 and is also fixedly coupled to moveable clutch disc 107 via screws 130. Stationary clutch disc 112 is shown positioned adjacent to spacers 133 and fixedly coupled to clutch arm 117 via screws 130. Internal shaft 127 is shown positioned within the center opening of each of the clutch discs 107, 112, spacers 133, aligned with moveable shaft 126 and secured by retainer rings 132.

FIG. 7A illustrate the view taken along Section B-B of FIG. 7B and shows the configuration of a plurality of pockets 122 formed within the stationary clutch disc 112. Each pocket 122 contains a roller 123, a plug 125 and a spring 124. In an exemplary embodiment, the clutch discs 107, 112 each contain three pockets 122, but it should be understood that the clutch discs 107, 112 could alternatively operate with more or fewer pockets. For example, a clutch disc 107, 112 with only one pocket could be used in order to reduce manufacturing costs of the clutch disc 107, 112 and to reduce drag between the rollers 123 and the internal shaft 127. It should also be understood that the clutch discs 107, 112 could operate with different relative numbers of pockets 122.

Figure 9:
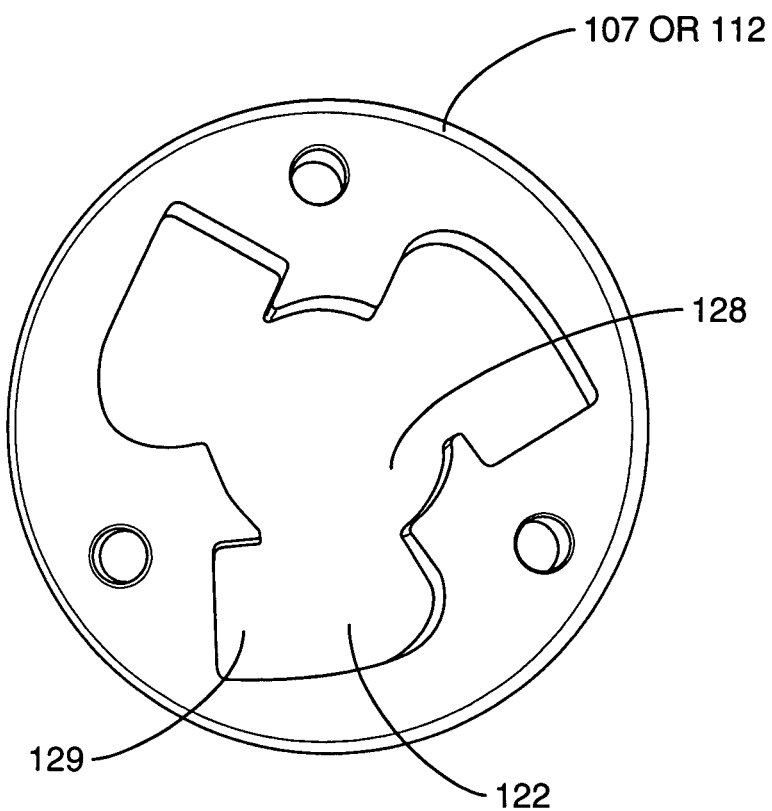
FIG. 9 is a front view of a clutch disc showing three pockets.
Figure 10:
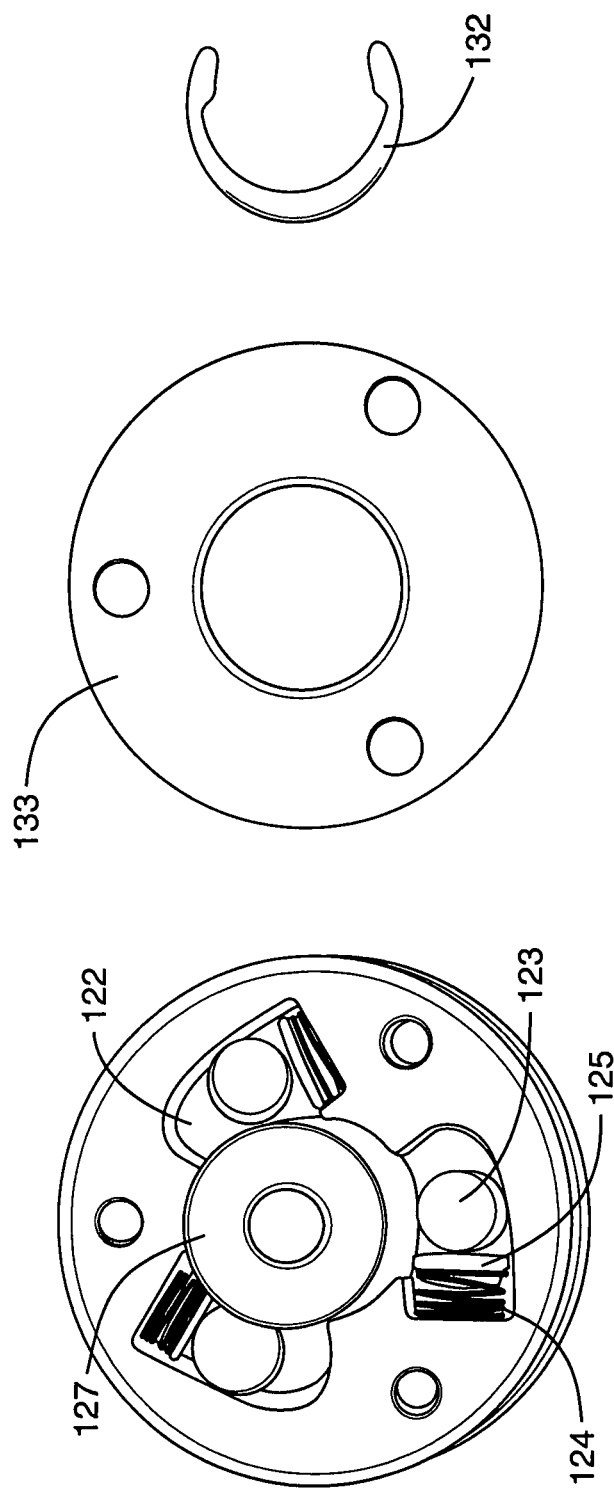
FIG. 10A is a front view of an assembled stationary clutch disc and an internal shaft.
FIG. 10B is a front view of a spacer.
FIG. 10C is a front view of a retaining ring.

FIG. 9 shows a front view of an embodiment of a clutch disc 107 or 112. The direction of rotation that the clutch disc 107 or 112 permits (as opposed to preventing) depends on how it is installed on a shaft. Therefore, the clutch disc 107 or 112 shown in FIG. 9 could be used as the moveable clutch disc 107 or the stationary clutch disc 112 as described above. FIG. 9 illustrates the pockets 122 along with their proximal and distal ends 128, 129. In the exemplary embodiment the clutch discs are made from powder metal formed steel via a sintering process, but it would be understood by persons skilled in the art that they could be made from any material with the appropriate strength, toughness and hardness including; titanium, stainless steel, zinc and re-enforced engineering plastics (for example nylon or poly-carbonate).

FIG. 10A shows a closer view of the clutch disc of FIG. 9 with the internal shaft 127 installed through the center of the disc. FIG. 9 also shows the spring 124, plug 125 and roller 123 installed within the pocket 122. If the clutch disc is the stationary clutch disc 112 and is provided with the internal shaft 127 as shown then if the internal shaft 127 is otherwise driven in the clockwise direction it will remain disengaged from the stationary clutch disc 112 and be allowed to freely rotate in the clockwise direction. However, if it is attempted to drive the shaft in the counter-clockwise direction, then the stationary clutch disc 112 will engage with the internal shaft 127 and prevent the internal shaft 127 from rotating in the counter-clockwise direction Alternatively, if the clutch disc shown is the moveable clutch disc 107, then if the moveable clutch disc 107 is rotated in the clockwise direction then the internal shaft 127 would become engaged with the moveable clutch disc 107 and be driven in a clockwise direction. If the clutch disc is subsequently rotated in the counter-clockwise direction the internal shaft 127 would disengage from the moveable clutch disc 107. Adjacent to the clutch disc are spacer 133 and retaining ring 132, which when assembled will create a portion of the exemplary clutch assembly shown in FIG. 8A. It should be understood that the rollers 123, spacers 133, centre spacer 134 and internal shaft 127 could be made from any material with the appropriate strength, toughness and hardness including; titanium, stainless steel, zinc and re-enforced engineering plastics (for example nylon or poly-carbonate).

FIG. 7C illustrate the view taken along section A-A of FIG. 7B and shows the arrangement of rollers 123, plugs 125 and springs 124 within pockets 122 of the moveable clutch disc 107. Each pocket 122 has a proximal end 128 located adjacent, and in communication with, the center opening of the moveable clutch disc 107 and a distal end 129. The mounted plug 125 is shaped and sized to fit within one end of the spring 124 (as shown more clearly in FIG. 10A) to form a spring 124 and mounted plug 125 combination. The other end of the spring 124 is sized to fit within the distal end wall of the pocket 122. Within each pocket 122, a roller 123 is then positioned within the pocket 122, between the plug 125 and the proximate end 128 of the pocket 122. As shown in FIG. 9, the radial distance within a pocket 122 for containing the roller 123 is greater at the distal end 129 than at the proximate end 128 of the pocket 122. Specifically the radial distance between the wall of the pocket 122 at the distal end 129 of the pocket 122 and the surface of the internal shaft 127 is greater than the radial distance between wall of the pocket 122 at the proximate end 129 of the pocket 122 and the surface of the internal shaft 127.

Together, the spring 124 and the plug 125 form a biasing element that exerts a biasing force on the roller 123. The biasing force acts to move the roller 123 toward the proximate end 128 of the pocket 122 and to physically contact the outer surface of the internal shaft 127. The biasing force generated by each spring 124 and plug 125 combination within the pockets 122, is designed to hold the rollers 123 in continuous rolling contact with the surface of the internal shaft 127. Finally, while the rollers 123 of the exemplary embodiment are shown as cylinders, it would be understood by persons skilled in the art that the rollers 123 could be spheres or any other shape that can fit within the pockets 122 and rotate about an axis of rotation parallel to the longitudinal axis of rotation 136.

During the operation of the clutch assembly 101, the biasing element maintains the rollers 123 in continuous rolling contact with the surface of the internal shaft 127. As discussed, in the exemplary embodiment, each biasing element is the combination of a spring 124 and a plug 125 where the plug 125 is shaped and sized to fit with one end of the spring 124. However, it should be understood by persons skilled in the art that the biasing element could be implemented by any component(s) with comparable elasticity, such as an elastomer cushion or a gas cylinder.

Referring to FIGS. 7A and 7C, the internal operation of the unidirectional clutch assembly 101 will now be discussed. When the clutch assembly 101 is at rest, the biasing force is the only force acting on the rollers 123. However, when there is relative motion between the clutch discs 107, 112 and the internal shaft 127, the rolling contact between the rollers 123 and the surface of the internal shaft 127 creates a reactionary force that acts on the rollers 123.

For example, if the internal shaft 127, as shown in FIG. 7C, is at rest and movable clutch disc 107 is rotated in primary rotational direction 135, a reactionary force between the surface of the internal shaft 127 and the rollers 123 will cause the rollers 123 to roll toward the proximate end 128 of the pockets 122. The biasing force exerted by the springs 124 and the plugs 125 on the rollers 123 will also simultaneously act in the direction of the proximate end 128 of the pockets 122. As a result of these two additive forces, the rollers 123 will roll toward the proximate end 128 of the pockets 122 and become wedged between the narrowing walls of the pockets 122, as described above with reference to FIG. 9, and the surface of the internal shaft 127. When wedged in such a manner, the rollers 123 exert an increased frictional force on the surface of the internal shaft 127 impeding any relative rotation between the internal shaft 127 and the moveable clutch disc 107. When the relative rotation between the internal shaft 127 and the moveable clutch disc 107 is prevented in this manner, the moveable clutch disc is said to be engaged with the internal shaft 127.

In contrast, if the moveable clutch disc 107 rotates in a direction opposite to the primary rotational direction 135 about a stationary internal shaft 127, a reactionary force between the surface of the internal shaft 127 and the rollers 123 will be created that acts on the rollers 123 in the direction of the distal ends 129 of the pockets 122. Simultaneously, the biasing force exerted by the springs 124 and plugs 125 will continue to act on the rollers 123 in the direction of the proximate ends 128 of the pockets 122. In this case the rollers 123 are acted upon by the two opposing forces and will therefore move in the direction of the net force (the difference between the biasing force and the reactionary force) and will come to rest at the point of equilibrium where both forces are equal in magnitude.

In the exemplary embodiment of the movable clutch disc 107 shown in FIG. 7C, the reactionary force will be of greater magnitude than initial, at rest, biasing force. As a result of this force imbalance, when the relative rotation begins, the rollers 123 will be subjected to a net force in the direction of the distal end 129 of the pockets 122 which will cause the rollers 123 to move in that direction. However, the biasing elements, namely in this exemplary embodiment, the springs 124 and plugs 125, are configured such that the magnitude of the biasing force acting on the rollers 123 increases as the rollers 123 approach the distal ends 129 of the pockets 122 according to the equation $F=kx$, where F is the biasing force (N), k is the spring constant of the spring 124 (N/m) and x is the relative displacement of the roller 123 from its rest position (m).

Therefore, as the rollers 123 move toward the distal ends 129 of the pockets 122 (increasing x) the biasing force exerted on the rollers 123 also increases. The biasing elements of the moveable clutch disc 107 are designed such that the biasing force will equal the reactionary force at a given value of x such that the rollers 123 reach an equilibrium position within the pockets 122 between the proximate and distal ends 128, 129. When the rollers 123 are located in this equilibrium position, they do not exert a high frictional force on the surface of the internal shaft 127 thereby allowing rotation of the internal shaft 127 relative to the moveable clutch disc 107. When the internal shaft 127 is free to rotate relative to the moveable clutch disc 107, the moveable clutch disc 107 is said to be disengaged from the internal shaft 127. The stationary clutch disc 112 operates in the same manner as the moveable clutch disc 107 as described above.

As shown in FIG. 7A, when the internal shaft 127 rotates in the primary rotational direction 135, and stationary clutch disc 112 remains stationary, the reactionary force caused by the rotation of the internal shaft 127 will overcome the biasing force of spring 124 and move the rollers 123 further into the pocket 122 toward its distal end 129. This will result in reduced friction between rollers 123 and the surface of the internal shaft 127 allowing the internal shaft 127 to rotate freely and the stationary clutch disc 112 will disengage with the internal shaft 127.

However, if the internal shaft 127 is rotated in a direction opposite to rotational direction 135, the reactionary force and the biasing force of the springs 124 would move the rollers 123 toward the proximal ends 128 of the pockets 122. The rollers 123 would then become wedged between the walls of the pocket 122 and the surface of the internal shaft 127. The surface of the wedged roller 123 would then exert an increased frictional force on the surface of the internal shaft 127 preventing rotation of the internal shaft 127 and accordingly the stationary clutch disc 112 is said to be engaged with the internal shaft 127. The exemplary embodiment of the unidirectional clutch assembly 101 as shown in FIGS. 7A, 7B, 7C, 8A and 8B takes advantage of the operation of both clutch discs 107, 112 described above. In the exemplary embodiment, moveable shaft 126 is driven by the impellers of a positive displacement rotary gas meter 20 as shown in FIGS. 1 to 4.

When gas is flowing in the primary direction (from inflow 22 to outflow 30 shown in FIG. 1), at least one of the impellers (not shown) will directly or indirectly drive the moveable shaft 126 in the primary rotational direction 135. This rotation of moveable shaft 126 will cause mounting disc 102 and moveable clutch disc 107 to also rotate in primary rotational direction 135. The rotation of the moveable clutch disc 107 relative to the internal shaft 127 will cause the moveable clutch disc 107 to become engaged on the internal shaft 127, as described above, which will cause the internal shaft 127 to be driven in the primary rotational direction 135.

During operation, the surface of the internal shaft 127 is also in continuous contact with the rollers 123 of the stationary clutch disc 112 and is connected to an input shaft 120. As discussed in relation to FIGS. 7A, 7B and 7C, when the internal shaft 127 is rotated in the primary rotational direction 135, the stationary clutch disc 112 will disengage from the internal shaft 127 and allow the internal shaft 127 to rotate freely, driving any input shaft 120 coupled to the internal shaft 127, for example a counter module device or the positive drive clutch assembly (not shown).

In the exemplary embodiment, if gas flow is reversed (for any of the reasons described above), moveable shaft 126 will be stopped, and then driven in a reverse direction (opposite to primary rotational direction 135) by the gas meter impellers (not shown). When moveable shaft 126 is driven in the opposite direction, mounting disc 102 and moveable clutch disc 107 will also be rotated in the direction opposite to the primary rotational direction 135. Rotation in this opposite direction will cause the moveable clutch disc 107 to disengage from the internal shaft 127, as described above, greatly reducing the amount of force driving the internal shaft 127 in reverse. Simultaneously, the relative rotation of the internal shaft 127 in the opposite direction will cause stationary clutch disc 112 to engage the internal shaft 127 which will prevent the internal shaft 127 from rotating in the reverse direction as described above.

When used together, for example as shown in FIGS. 10A-13B, the clutch discs 107, 112 will serve to immediately decouple moveable shaft 126 from a counting device attached to internal shaft 127 in response to any rotation in the opposite direction to the primary rotation direction 135, preventing any counting.

Figure 8A:
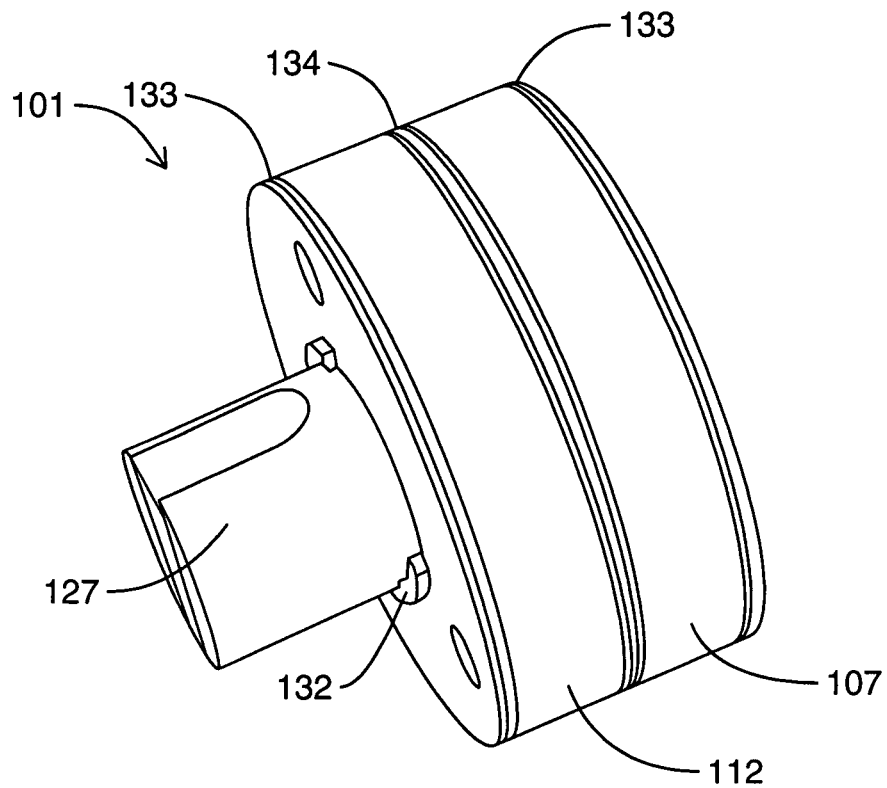
FIG. 8A is a perspective view of the unidirectional clutch assembly.
Figure 8B:
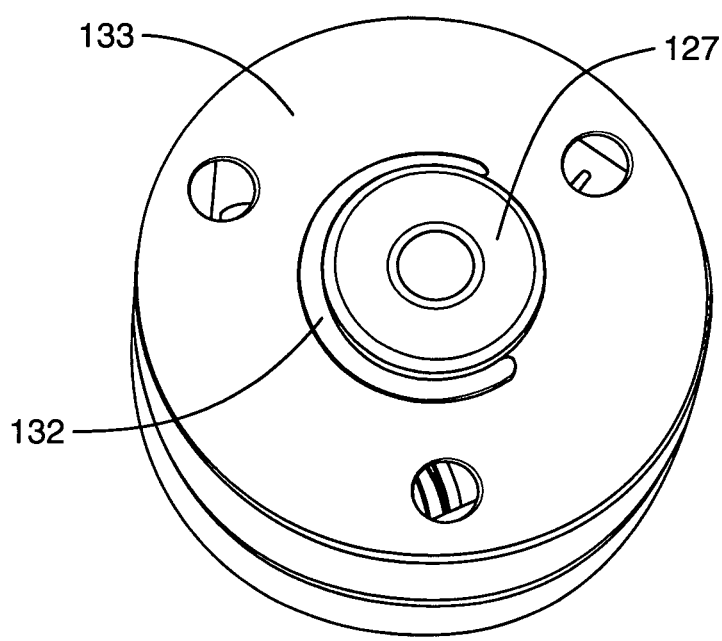
FIG. 8B is an end view of the unidirectional clutch assembly.

FIGS. 8A and 8B show isometric views of the exemplary embodiment of the unidirectional clutch assembly 101. FIG. 8A shows the relative positions of the moveable clutch disc 107, the stationary clutch disc 112, the spacers 133, the center spacer 134, the internal shaft 127 and the retaining rings 132. FIG. 8B shows the same assembly of components from the opposite side. FIG. 8B shows the internal end of the internal shaft 127 slightly protruding through spacer 133, that is positioned adjacent to the moveable clutch disc 107 outer face 109, and being secured with retaining ring 132. FIGS. 8A and 8B illustrate the relative position of the elements of the clutch 101 and the positioning and securing function of the retaining rings 132.

FIGS. 11, 12, 13A and 13B show an exemplary implementation of the unidirectional clutch assembly 101 within the counter module 46 of a rotary gas meter. In this configuration the impellers of the meter (not shown) are driven by a gas flow and in turn drive a gear train. The moveable shaft 126 is driven by the gear train and is attached to the mounting disc 102. When the impellers are driven in the primary rotational direction 135, the mounting disc 102 and moveable clutch disc 107 are rotated in the primary direction which engages the internal shaft 127 as described above. The internal shaft 127 rotating in the primary direction disengages stationary clutch disc 112, as described above, and drives a counting device. If the gas flow reverses, the reverse rotation of moveable shaft 126 will disengage moveable clutch disc 107, reduce the driving force on internal shaft 127, and engage stationary clutch disc 112 which will prevent internal shaft 127 from driving the counting device thereby eliminating any counting.

Figure 14A:
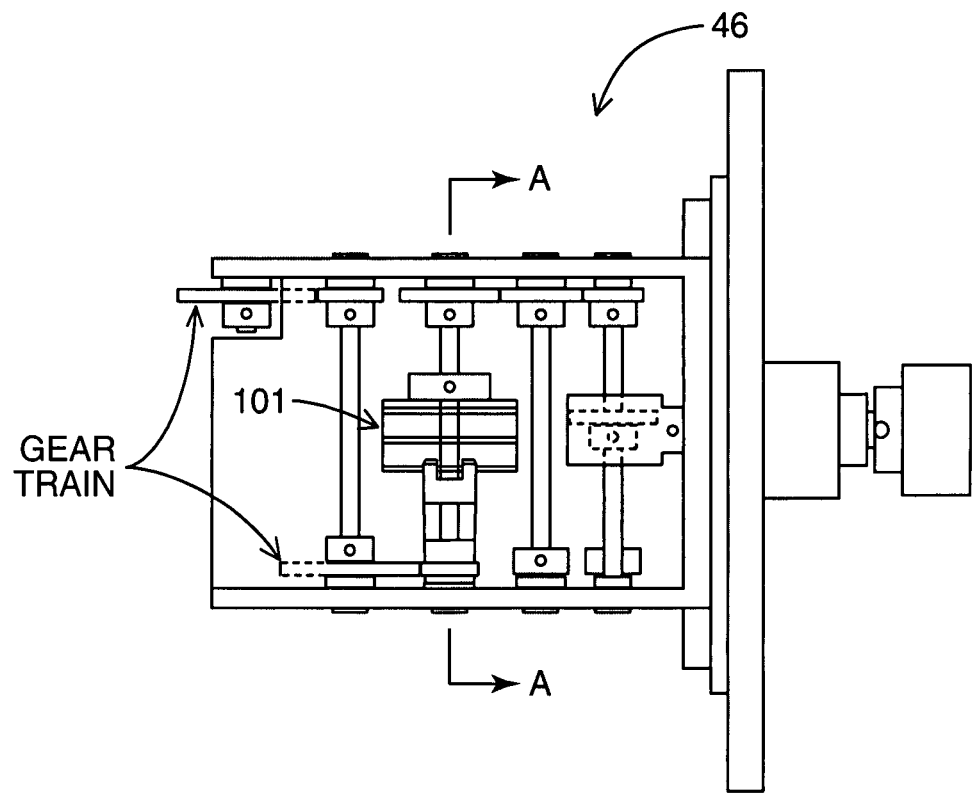
FIGS. 14A and 14B show an alternate configuration for a unidirectional clutch assembly installed within the counter module of a positive displacement rotary gas meter.
Figure 14B:
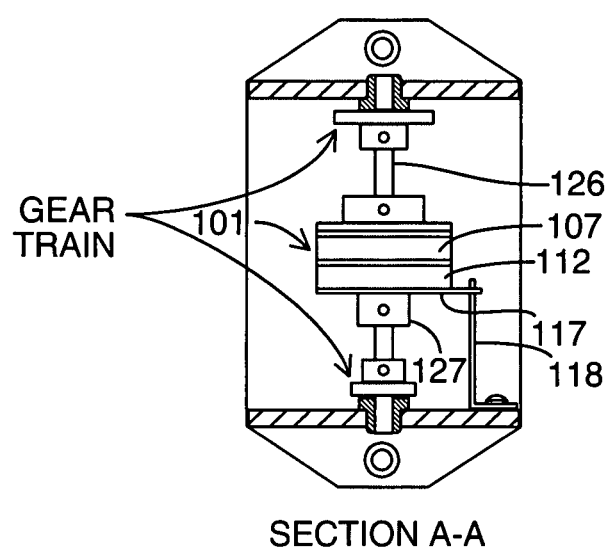

FIGS. 14A and 14B shows another exemplary implementation of the clutch assembly 101 in relation to the counter module 46. In this configuration, the clutch assembly 101 is configured as an integral component of the gear train rather than as the coupling between the gear train and the counting device. In operation, the clutch assembly 101 operates in the same manner as described above. Rotation in the primary rotational direction 135 engages the moveable clutch disc 107 that drives the internal shaft 127 and disengages the stationary clutch disc 112 permitting the transmission of power through the gear train. In contrast, rotation in the opposite direction disengages the moveable clutch disc 107 and engages the stationary clutch disc 112 which prevents opposite rotation of the internal shaft 127 and any counter and/or any additional equipment attached thereto.

Accordingly, it should be understood that the unidirectional clutch assembly 101 need not be installed within the counter module 46. An embodiment of the unidirectional clutch assembly 101 can be installed in a variety of locations depending on a number of criteria including space constraints, safety concerns and maintenance and reliability concerns.

Figure 15:
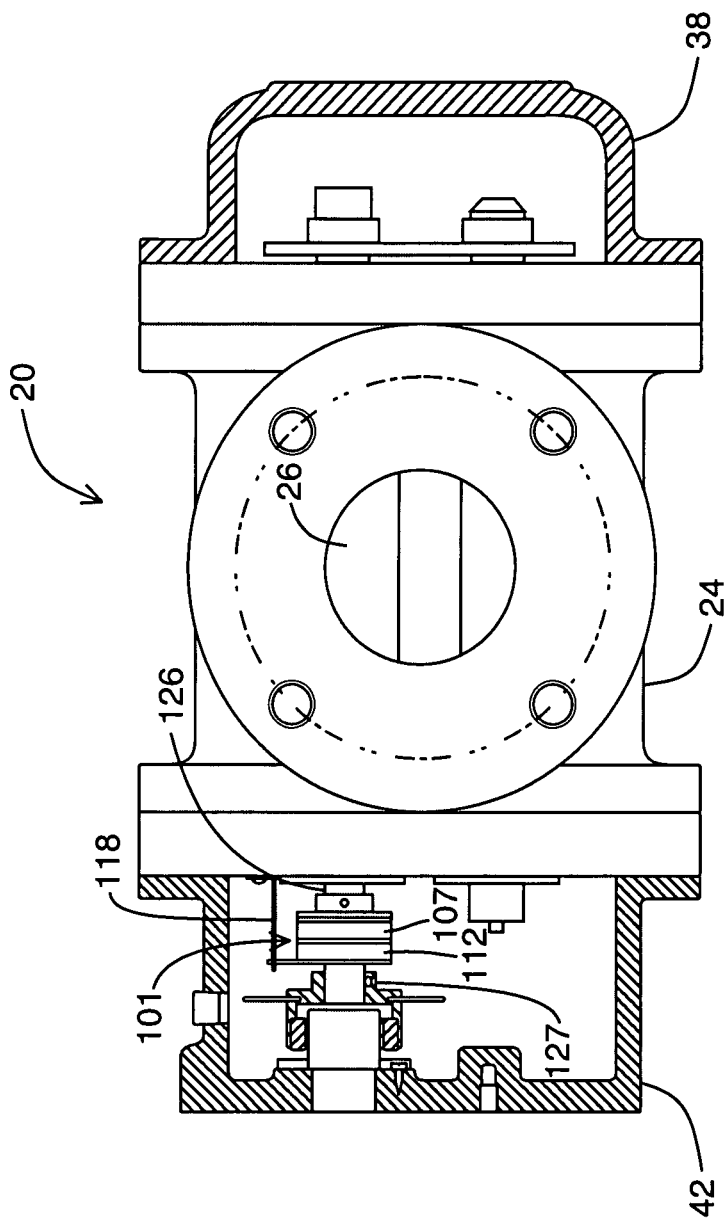
FIG. 15 is a top view of a positive displacement rotary gas meter with a cut away section showing a unidirectional clutch assembly installed within the magnetic housing.

FIG. 15 shows an alternate implementation of the unidirectional clutch assembly 101 within the magnetic housing 42. In this configuration, the clutch assembly 101 can disengage the impellers from the output shaft of the magnetic housing 42 in response to reverse rotation as described above. Preventing the rotation of the output shaft of the magnetic housing 42 will prevent any rotation within the counter module (as shown in FIGS. 11 to 18) and therefore prevent counting.

Figure 16:
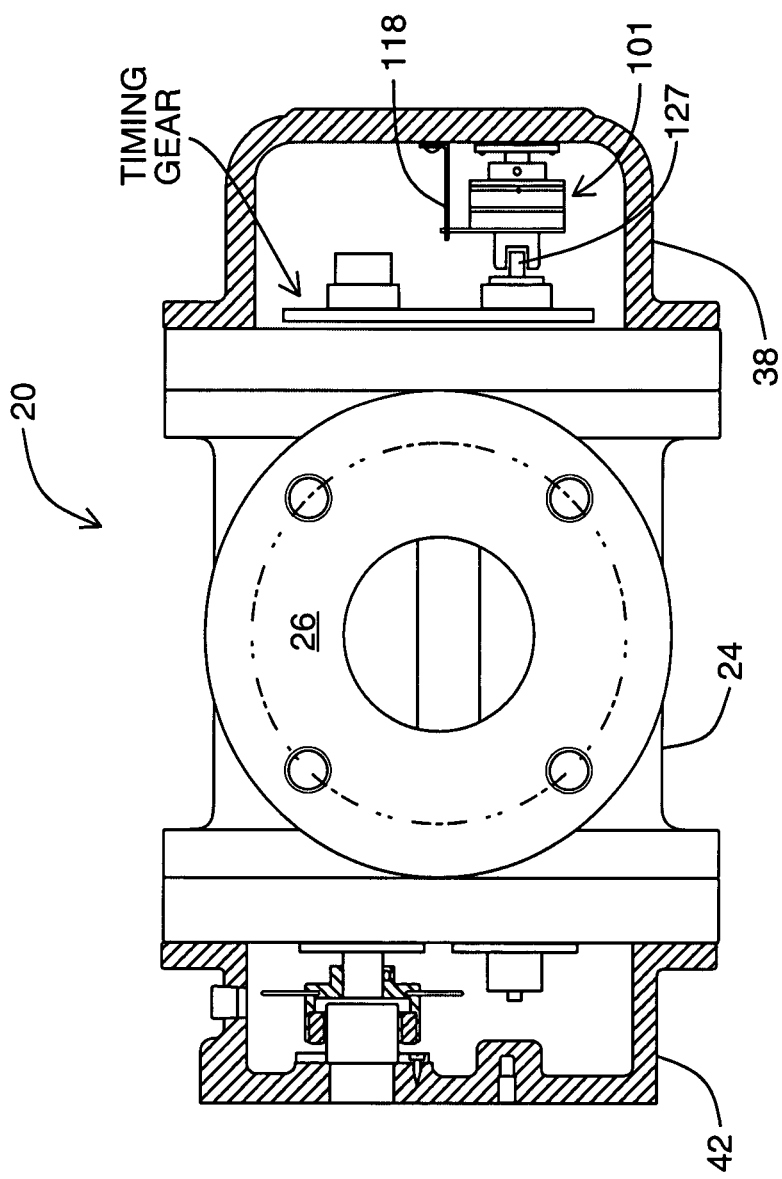
FIG. 16 is a top view of a positive displacement rotary gas meter with a cut away section showing the unidirectional clutch assembly installed within the thrust end section.

FIG. 16 shows yet another alternate implementation of the unidirectional clutch assembly 101. In this implementation, the clutch assembly 101 is installed within the thrust end section 38 of the meter 20 and is directly attached to an impeller shaft (not shown). In this embodiment the driving impeller shaft is directly connected to the internal shaft 127 which will be prevented from rotating in the reverse direction by stationary clutch disc 112. Using this configuration, the impellers will be prevented from rotating in the reverse direction which will prevent counting. It should be understood that the unidirectional clutch assembly 101 can be installed in this configuration within the thrust end section 38, as described above, or within the magnetic housing 42.

Figure 17:
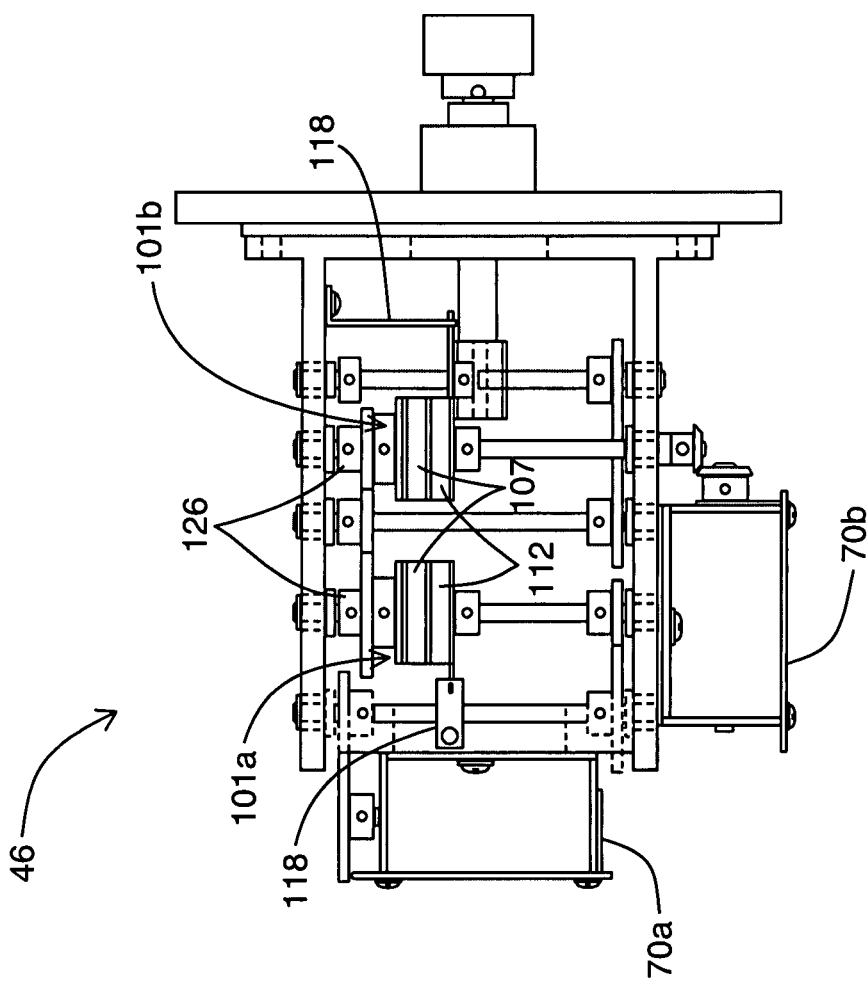
FIG. 17 is a section view showing an optional installation of two unidirectional clutch assemblies within a counter module.
Figure 18:
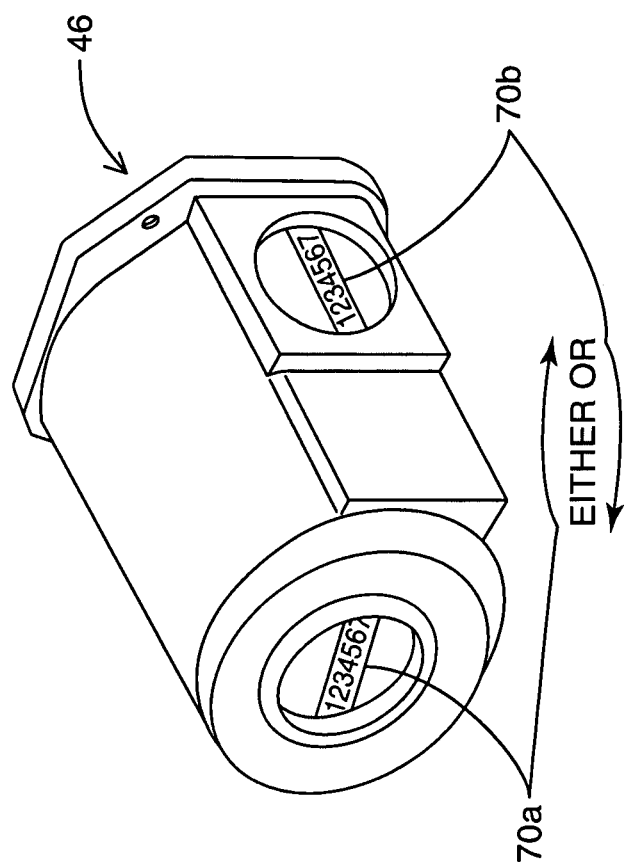
FIG. 18 is a perspective view of a counter module housing two counters and two unidirectional clutch devices.
Figure 19:
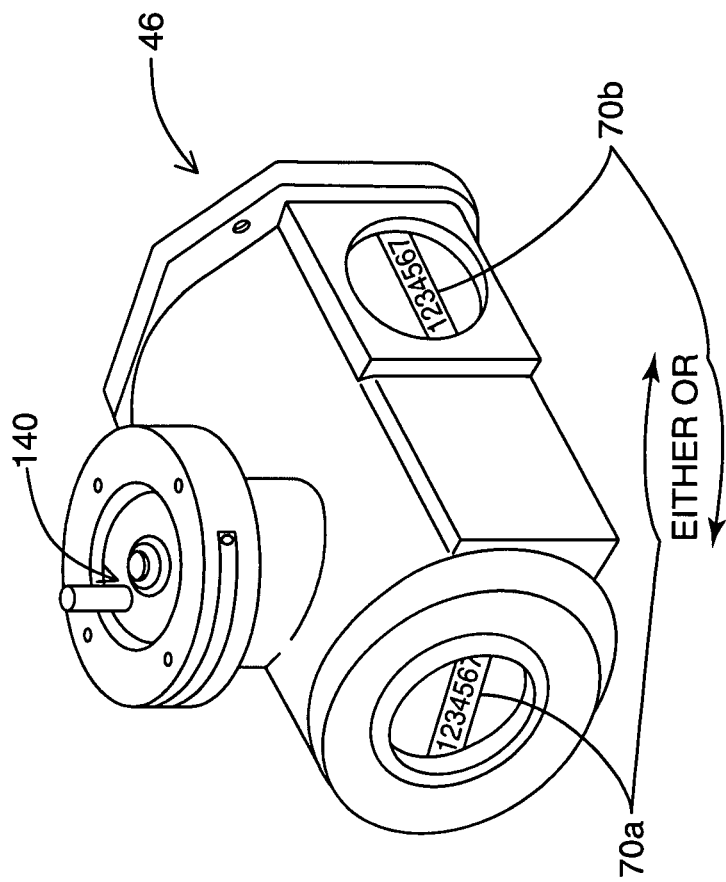
FIG. 19 is a perspective view of an alternate configuration of a counter module housing two counters and two unidirectional clutch devices.

FIGS. 17, 18 and 19 show yet another alternate implementation of a unidirectional clutch assembly 101 using multiple clutch assemblies, which for the purpose of this illustration will be referred to as 101*a* and 101*b*. In an exemplary embodiment of the rotary gas meter 20 the counter module 46 may comprise a primary flow mechanical counter 70*a* and a reverse flow mechanical counter 70*b*. The use of two mechanical counter devices 70*a*, 70*b* allows for an accurate analysis of all gas flow passing through the gas meter 20. Such an embodiment would be particularly useful in situations where there is a chance that the gas meter 20 will be intentionally installed in a reverse orientation in an attempt to circumvent the counter function of the meter. With the addition of a reverse flow mechanical counter 70*b*, reverse flow can be accurately counted and gas usage can be precisely accounted for, even in the event that the gas meter 20 itself was improperly installed.

In an exemplary embodiment, two unidirectional clutch assemblies 101*a* and 101*b* are installed within the counter module 46 as shown in FIG. 17. The clutch assemblies 101*a* and 101*b* each function in the manner described above but are configured such that they have opposing primary, or engaging, rotation directions. As described above, it is the configuration of the pockets 122 and rollers 123 within each clutch disc 107 and 112 that determines the direction of rotation that will be transferred through the clutch. For example, in an exemplary embodiment, a unidirectional clutch assembly 101*a* may be configured to transfer rotation in a clockwise direction and to become decoupled in response to rotation in a counter-clockwise direction. Alternatively, the clutch discs 107 and 112 may be rearranged within the clutch assembly 101*b* such that it transmits rotation in a counter-clockwise direction and becomes decoupled in response to clockwise rotation. Arranging two unidirectional clutch assemblies 101 that have different primary rotation directions as described above enables a rotary gas meter 20 to accurately count all gas flowing in the primary and reverse directions.

FIG. 17 shows an implementation of two unidirectional clutch assemblies 101 that have different primary rotation directions as described above. During primary flow conditions clutch assembly 101*a* will become engaged and drive the primary flow mechanical counter 70*a* while the clutch assembly 101*b* will be disengaged and reverse flow mechanical counter 70*b* will not be driven. If the flow were to reverse, or if the meter were to be installed improperly, the flow would drive the impellers (not shown) in a reverse direction. Reverse flow rotation would disengage clutch assembly 101*a*, decoupling the primary flow mechanical counter 70*a* as described in detail above, whereas clutch assembly 101*b* would become engaged and would drive reverse flow mechanical counter 70*b*. Operating in this manner, one of the mechanical counters 70*a* and 70*b* would be engaged at all times gas was flowing through the gas meter 20. The total amount of gas used could then be determined by summing the values from the two mechanical counters 70*a* and 70*b*.

FIGS. 18 and 19 show the exterior of differently configured gas meter counter modules 46. Both figures show the use of primary and reverse flow mechanical counters 70*a* and 70*b* and the display of their totals. It would be understood by a person skilled in the art that the positions of the two mechanical counters 70*a*, 70*b* could be modified in response to space, accessibility or safety constraints. It would also be understood that the indicated positions of the mechanical counters 70*a* and 70*b* is merely illustrative and that their positions within the counter module 46 could be interchanged.

Accordingly, the unidirectional clutch assembly 101 advantageously solves the counting problems associate with gas flow reversal. When the unidirectional clutch assembly is installed within a rotary gas meter, it is designed to respond to a gas flow reversal by automatically decoupling the counter from the impellers that are rotating in an opposite direction, thus effectively preventing any degree of opposite rotation of the counter and thereby preventing any counting. In an exemplary implementation, multiple unidirectional clutch devices can be installed within a rotary gas meter such that they allow the meter to accurately count both primary and reverse gas flows. In another exemplary implementation, the unidirectional clutch assembly can be installed such that it prevents reverse rotation of the counter by locking the impellers in a fixed position and thus effectively preventing any degree rotation in the opposite direction.

It would be understood by persons skilled in the art that the described embodiments are only illustrative of the possible installation configurations of the unidirectional clutch assembly 101. It would also be understood by persons skilled in the art that different results can be obtained within any installation configuration by varying the attachment location of the driving shaft to either the mounting disc 102 or the internal shaft 127 and by changing the position of the clutch discs 107, 112 thereby determining the primary rotational direction that will engage or disengage the clutch assembly 101. It should also be understood that the unidirectional clutch assembly 101 can be used in any metering device in the gas and water industries where it is desired to allow the transmission of rotation from a driven shaft to an input shaft in a primary rotational direction, when the driven shaft is rotated in a primary rotational direction, and to prevent the transmission of rotation from a driven shaft to an input shaft when the driven shaft is rotated in an opposite rotational direction.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A unidirectional clutch assembly for coupling an input shaft to a driven shaft associated with a stationary body, said unidirectional clutch assembly comprising:
   (a) an internal shaft having an outer surface, a first end, and a second end, wherein the second end of the internal shaft is adapted to be coupled to the input shaft, and wherein the driven shaft, the internal shaft, and the input shaft are sequentially aligned and axially displaced along a common longitudinal axis;

(b) a moveable clutch disc coupled to the driven shaft and positioned orthogonal to the common longitudinal axis, and having a first opening shaped for receiving the internal shaft and a first engaging element for releasably engaging the internal shaft when the moveable clutch disc is rotated relative to the internal shaft in a primary rotation direction;

(c) a stationary clutch disc positioned orthogonal to the common longitudinal axis and parallel to the moveable clutch disc, said stationary clutch disc having its motion restrained by the stationary body such that it remains substantially stationary relative to the stationary body, said stationary clutch disc having a second opening shaped for receiving the internal shaft and a second engaging element for releasably engaging the internal shaft when the internal shaft is rotated relative to the stationary clutch disc in a direction opposite to the primary rotation direction;

(d) said internal shaft being positioned within the opening of each of the moveable clutch disc and the stationary clutch disc such that the second end of the internal shaft extends from the stationary clutch disc in a direction away from the moveable clutch disc and the outer surface of the internal shaft is in continuous rolling contact with the first and second engaging elements, such that:

(I) when the driven shaft rotates in the primary rotation direction, the movable clutch disk is rotated in the primary direction and the first engaging element engages the moveable clutch disc with the internal shaft and transfers rotation to the internal shaft in the primary rotation direction and the second engaging element disengages the stationary clutch disc from the internal shaft to allow the internal shaft to rotate freely; and (II) when the driven shaft rotates in the direction opposite to the primary rotation direction, the movable clutch disk is rotated in the direction opposite to the primary rotation direction and the first engaging element disengages the moveable clutch disc from the internal shaft and the second engaging element engages the stationary clutch disc with the internal shaft to prevent the internal shaft from rotating.

2. The unidirectional clutch assembly of claim 1, wherein the moveable and stationary clutch discs each have formed therein at least one pocket in communication with said first and second opening, respectively, the at least one pocket in the moveable clutch disc having distal and proximate ends and containing the first engaging element, the at least one pocket in the stationary clutch disc having distal and proximate ends and containing the second engaging element, the first and second engaging elements each comprising a roller having an axis of rotation that is parallel to the common longitudinal axis such that the roller can travel between the distal and proximate ends of its respective pocket, each said roller being held in rolling contact with the surface of the internal shaft and biased towards the proximate end by a biasing element.

3. The unidirectional clutch assembly of claim 2, wherein the at least one pocket of the moveable clutch disc is configured such that the distal end of each of the at least one pocket leads the proximate end of that pocket when the moveable clutch disc is rotated in the primary rotation direction.

4. The unidirectional clutch assembly of claim 2, wherein each of the at least one pocket of the moveable clutch disc has a pocket wall, each pocket wall being shaped so that a radial distance between the pocket wall and the internal shaft at the proximate end of the pocket is less than a radial distance between the pocket wall and the internal shaft at the distal end of the pocket, so that when the internal shaft rotates relative to the pocket towards the proximate end of the pocket the roller wedges between the pocket wall and the outer surface of the internal shaft.

5. The unidirectional clutch assembly of claim 2, wherein the biasing element comprises a spring and a plug installed within the distal end of its respective pocket such that the spring biases the roller towards the proximate end of its respective pocket.

6. The unidirectional clutch assembly of claim 5, wherein the at least one pocket in the stationary clutch disc comprises three pockets, each of the three pockets with one spring, one plug and one roller.

7. The unidirectional clutch assembly of claim 5, wherein the at least one pocket in the moveable clutch disc comprises three pockets, each of the three pockets with one spring, one plug and one roller.

8. The unidirectional clutch assembly of claim 2, wherein the shape of the roller is selected from the group consisting of: spherical, cylindrical.

9. The unidirectional clutch assembly of claim 1, further comprising a clutch spacer positioned between the moveable clutch disc and the stationary clutch disc, said clutch spacer having a center opening shaped for receiving the internal shaft.

10. The unidirectional clutch assembly of claim 1, further comprising a stationary clutch arm, wherein the stationary clutch arm is rigidly coupled to the stationary body and the stationary clutch disc is restrained within the stationary clutch arm.

11. The unidirectional clutch assembly of claim 1, wherein the moveable clutch disc is coupled to the driven shaft through a mounting disc that rotates around the common longitudinal axis, and that is fixedly attached to the driven shaft.

12. The unidirectional clutch assembly of claim 11, wherein the mounting disc is attached to the driven shaft using a set-screw.

13. The unidirectional clutch assembly of claim 1 wherein at least one of the driven and the input shaft is driven by an external load.

14. The unidirectional clutch assembly of claim 1 wherein the unidirectional clutch assembly is attached to a positive displacement rotary gas meter comprising at least a magnetic housing, a counter module and a thrust end section.

15. The unidirectional clutch assembly of claim 14 wherein the unidirectional clutch assembly is positioned within the counter module of the positive displacement rotary gas meter.

16. The unidirectional clutch assembly of claim 15 wherein the driven shaft comprises the output of a counter module gear train and the input shaft comprises the input shaft of a counter.

17. The unidirectional clutch assembly of claim 14 wherein the unidirectional clutch assembly is installed as an integral member of a counter module gear train wherein the driven shaft comprises a driven member of the counter module gear train and the input shaft comprises a driveable member of the counter module gear train.

18. The unidirectional clutch assembly of claim 17 wherein the unidirectional clutch assembly is installed within the magnetic housing of the positive displacement rotary gas meter such that it prevents the transfer of movement through the magnetic housing.

19. The unidirectional clutch assembly of claim 18 wherein the driven shaft comprises an impeller shaft and the input shaft comprises a shaft magnetically coupled to the input shaft of the counter module of the positive displacement rotary gas meter.

20. The unidirectional clutch assembly of claim 14 wherein the unidirectional clutch assembly is installed within one of the thrust end section and the magnetic housing of the positive displacement rotary gas meter such that it prevents the rotation of the impellers of the positive displacement rotary gas meter.

21. The unidirectional clutch assembly of claim 20 wherein the driven shaft comprises a shaft fixedly attached to one of the thrust end section and the magnetic housing and the input shaft comprises the shaft of an impeller of the positive displacement rotary gas meter.

22. A multi-clutch assembly wherein a first unidirectional clutch assembly of claim 14 and a second unidirectional clutch assembly of claim 14 are installed within the counter module gear train of the positive displacement rotary gas meter.

23. The multi-clutch assembly of claim 22 wherein the driven shaft of the first unidirectional clutch assembly comprises a driven member of the counter module gear train and the input shaft of the first unidirectional clutch assembly comprises the input shaft of a first counter within the counter module.

24. The multi-clutch assembly of claim 22 wherein the driven shaft of the second unidirectional clutch assembly comprises the driven member of the counter module gear train and the input shaft of the second unidirectional clutch assembly comprises the input shaft of a second counter within the counter module.

* * * * *